E. A. SCHADE.
BIT BRACE.
APPLICATION FILED DEC. 20, 1915.
1,188,363. Patented June 20, 1916.
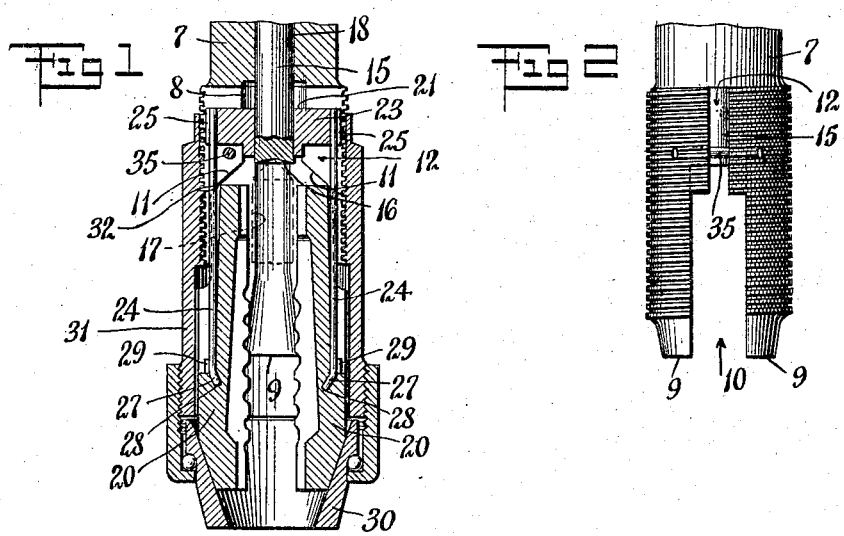
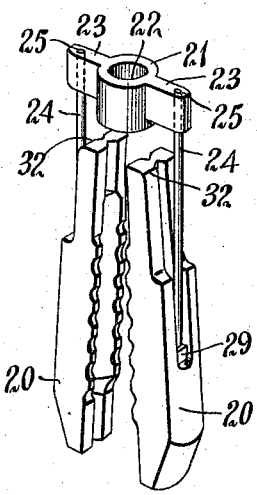
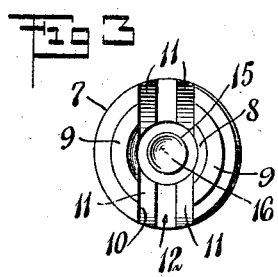
Inventor
Edmund A. Schade
By his Attorneys
Mitchell & Allyn

UNITED STATES PATENT OFFICE.

EDMUND A. SCHADE, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

BIT-BRACE.

1,188,363.  Specification of Letters Patent.  Patented June 20, 1916.

Application filed December 20, 1915. Serial No. 67,707.

*To all whom it may concern:*

Be it known that I, EDMUND A. SCHADE, a citizen of the United States of America, residing at New Britain, Connecticut, have invented a new and useful Bit-Brace, of which the following is a specification.

My present invention relates particularly to the chuck or tool gripping mechanism of bit braces, and the general objects of the invention are to simplify and improve constructions of this character.

A special object of the invention is to maintain the tool shank gripping jaws in substantial parallelism for gripping cylindrical or straight shank tools and at the same time to enable said jaws to grip tapered or angular tool shanks when so required.

Another object of my invention is to take care of the thrust of the tool and to protect the jaws and the jaw supporting means from injury by the tool.

In the accomplishment of the foregoing and other objects, I employ a chuck body or core having a central bore to receive the tool shank and spaced apart sides between which the chuck jaws are held, and I support the chuck jaws on a yoke which is guided and supported in the inner end of the bore in the chuck body. The jaws are preferably mounted on spring supporting arms carried by the yoke and these spring arms are protected against injury by extending them on the outside of the chuck jaws and connecting them at points intermediate the ends of the jaws, this construction also permitting of the rocking motion necessary for the jaws to accommodate themselves to tapered or angular shaped tool shanks.

The thrust of the tool shanks is taken up by a thrust pin projecting concentrically into the inner end of the tool receiving bore, and this thrust pin is usually provided with a centering cavity in the end thereof for centering the tool shank.

A special feature resides in the employment of the thrust pin as a guiding means for the jaw supporting yoke, the yoke for this purpose being perforated to slide over said thrust pin. The chuck jaws are maintained normally in substantial parallelism and caused to approach and recede from each other on substantially parallel lines by the provision of inwardly inclined jaw closing shoulders engaged by the inner ends of the jaws and serving to force the inner ends of the jaws toward each other at the same time that the outer end portions of the jaws are forced toward each other by the beveled jaw closing ring or other means which may be provided for closing the jaws.

Various other features and details of construction will appear as the specification proceeds, attention being directed to the accompanying drawing which illustrates the invention embodied in a practical and at the present time, preferred form.

In this drawing: Figure 1 is a vertical sectional view of a chuck constructed in accordance with and embodying the invention. Fig. 2 is a view in side elevation of the chuck core which forms the body or stock of the chuck. Fig. 3 is an end elevation of this member. Fig. 4 is a detached perspective view of the unitary chuck jaws and holder.

Taking up now the drawing more in detail: The body or core of the chuck is designated 7, said body being formed with a central bore 8 to receive the tool shank and with spaced apart sides 9 having a slot 10 therebetween in which the chuck jaws are engaged.

At the inner end of the jaw receiving and holding slot 10, the chuck body is formed with jaw closing shoulders 11 inclined inwardly and toward the center of the chuck. In the construction illustrated the chuck body is formed with a narrower spring receiving slot 12 extending from the jaw closing shoulders inwardly toward the inner end of the tool receiving bore.

At the inner end of the bore in the chuck body is mounted a centrally disposed thrust receiving pin 15. This pin projects concentrically into the tool receiving bore into position to be engaged by the end of the tool shank, and the end of this thrust pin is preferably formed with a conical or concave cavity substantially as indicated at 16, Fig. 1, for centering the end of the tool shank 17 engaged therewith. The thrust pin is usually made of hardened steel and the same is shown secured in place by being driven into a central socket 18 formed in the chuck body at the enner end of the bore therein.

The chuck jaws 20, engaged in the slot 10 between the spaced apart sides 9, are, according to my invention, carried by a yoke 21 which is guided at the inner end of the bore in the chuck body. In the present disclosure this jaw supporting yoke is centrally perforated at 22 so as to slide over and be guided by the central thrust pin, and is provided with outwardly projecting arms 23 in the nature of fins working in the inner ends of the guide slot 12 and carrying the spring arms 24 to which the chuck jaws are attached.

The spring supporting arms 24 are shown as substantially straight spring rods secured in the ends of the yoke arms 23 by slotting the ends of such arms and then after inserting the spring rods clenching said split or slotted ends over the ends of the rods as indicated at 25. Instead of thus clenching or riveting the spring rods in place, other means for the purpose, such as soldering or welding may be employed. The spring supports are protected from injury by the tool shank by extending said supports as indicated, over the outside of the jaws and the necessary self adjustment of the jaws to tool shanks of different sizes and shapes is provided for by attaching the spring rods to the jaws at points intermediate the ends of the jaws as indicated at 27. The attachment of these springs to the jaws is made in the present instance, by engaging the ends of the spring rods in the angularly extending seats 28 in the jaws and then upsetting the metal of the jaws over the end portions of such springs as indicated at 29. This construction, while protecting the springs, permits the jaws to move resiliently toward and away from each other, or, through the flexure of the springs, to rock angularly toward or away from each other.

The jaw supporting springs exert their tension to normally hold the jaws separated in substantially parallel relation. The jaws are brought together or closed upon the bit shank or other article inserted between them by means, consisting in the present disclosure of the beveled jaw closing ring 30 engaging over the outer end portions of the jaws and carried by the shell or sleeve 31 which has screw threaded engagement over the threaded exterior of the core or chuck body. The longitudinal movement of the jaw closing ring on the chuck body, in addition to closing the jaws, has a tendency to shift the jaws longitudinally, and this effect is taken advantage of for maintaining the jaws in parallel relation by causing the inner ends of the jaws to bear upon and be shifted inwardly by the inwardly inclined jaw closing shoulders 11, as indicated in Fig. 1, the inner ends of the jaws being for this purpose preferably rounded or beveled as indicated at 32 so as to ride easily over the inclined jaw closing shoulders.

From the foregoing it will be apparent that the combined effect of the bevel jaw closing ring engaging with the outer end portions of the jaws and the inclined shoulders engaging with the inner ends of the same, will be to maintain the jaws in substantial parallelism and to cause the jaws to firmly grip the tool shank throughout the full length of the jaws, thus insuring a firm, positive gripping engagement with the tool. As the jaws are forced inwardly into engagement with the jaw closing shoulders, the yoke which supports the jaws slides freely on the centering pin so as not to interfere with or impede the parallel closing action of the jaws. If a tapered tool shank is inserted between the jaws, it will be evident that the jaws will then simply rock on their spring supports to the necessary extent to automatically adjust them to conformity with the shape of the shank.

The outward sliding movement of the spring supporting yoke on the centering pin may be limited so as to prevent accidental disengagement therefrom by suitable means, a cross pin 35 being employed in the present instance for this purpose, this cross pin being shown as engaged in the chuck body and passing in front of one of the outwardly projecting arms or fins of the yoke.

The chuck of my invention will be seen to be of simple and sturdy construction, and to have a powerful gripping and holding action. Also the chuck is relatively inexpensive and can be readily assembled since it consists of but practically three parts, the core or chuck body, the jaw unit, embodying the two jaws, the supporting springs and the yoke which carries them, which unit is mounted by simply inserting the yoke end of the unit into the bore in the chuck body and the third unit, the jaw closing sleeve which is simply threaded over the exterior of the chuck body.

What I claim is:

1. In a bit chuck, a chuck body having a central bore and spaced apart sides, a centrally disposed thrust pin at the inner end of said bore projecting concentrically into said bore and provided with a centering cavity in the exposed end thereof, a yoke engaged on said thrust pin and slidable longitudinally thereon, chuck jaws carried by said yoke and engaged between the spaced apart sides of the chuck body and means for closing the jaws.

2. In a bit chuck, a chuck body having a central bore and longitudinally slotted providing spaced apart sides, a centrally disposed externally smooth cylindrical guiding pin located at the inner end of said bore and projecting concentrically thereinto, a yoke seated in the inner end of said bore having a central collar portion slidably engaged on the smooth central guiding pin so as to be freely movable longitudinally thereon and outwardly projecting arms engaged in the inner end of the slot in the chuck body, spring arms carried by the outwardly projecting arms of the yoke, chuck jaws carried by said arms and engaged in the outermost portion of the slot between the spaced apart sides, means for closing the outer portion of said chuck jaws on a tool shank inserted therebetween and means for closing the inner end portions of the jaws on the tool shank in the longitudinal movement of the jaw supporting yoke on the central guiding pin.

3. In a bit chuck, a chuck body having a central bore and spaced apart sides, a centrally disposed guiding pin at the inner end of said bore projecting concentrically thereinto, a yoke engaged on said guiding pin and longitudinally slidable thereon, chuck jaws carried by said yoke between said spaced apart sides, jaw closing means engaging the outer end portions of said jaws to force them longitudinally and toward each other, jaw closing shoulders engaged by the inner ends of said jaws in the longitudinal movement thereof, and means limiting the outward sliding movement of the yoke on the guiding pin.

4. In a bit chuck, a chuck body having a central bore and spaced apart sides with a jaw receiving slot between said sides extending inwardly from the end of the body and a narrower spring receiving slot extending inwardly from the end of said jaw receiving slot, inwardly inclined jaw closing shoulders at the end of the jaw receiving slot, a centrally disposed thrust receiving and guiding pin at the inner end of the bore extending concentrically thereinto, a jaw supporting yoke having a central perforated collar portion slidably engaged on the thrust receiving pin, spring arms carried by said yoke received in the guiding slot, coöperating chuck jaws supported by the spring arms engaged in the jaw receiving slot between the sides of the chuck body and bearing at their inner ends upon the inclined jaw closing shoulders, and a jaw closing ring mounted on the chuck body and engaging the outer end portions of the chuck jaws.

EDMUND A. SCHADE.

Copies of this patent may be obtained for five cents each, by addressing the "Commissioner of Patents, Washington, D. C."